(12) United States Patent
Garcia del Valle et al.

(10) Patent No.: US 12,003,368 B1
(45) Date of Patent: Jun. 4, 2024

(54) SYMBIOTIC NETWORK ORCHESTRATOR FOR COMPUTING NETWORKS

(71) Applicant: Cisco Technology, Inc., San Jose, CA (US)

(72) Inventors: Pablo Garcia del Valle, Vaud (CH); Frank Brockners, Cologne (DE); Tal Maoz, Jerusalem (IL); Benjamin William Ryder, Lausanne (CH); Aviad Rom, Pardes Hanna-Karkur (IL)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/446,021

(22) Filed: Aug. 8, 2023

(51) Int. Cl.
*H04L 41/0816* (2022.01)
*H04L 41/0894* (2022.01)

(52) U.S. Cl.
CPC ...... *H04L 41/0816* (2013.01); *H04L 41/0894* (2022.05)

(58) Field of Classification Search
CPC ................. H04L 41/0816; H04L 41/0894
See application file for complete search history.

(56) References Cited

U.S. PATENT DOCUMENTS

| | | | |
|---|---|---|---|
| 11,601,327 B1 * | 3/2023 | Khalid | H04L 41/40 |
| 2021/0011825 A1 | 1/2021 | Aggarwal et al. | |
| 2021/0243053 A1 | 8/2021 | Dunbar | |
| 2022/0086061 A1 | 3/2022 | Natal et al. | |
| 2022/0342649 A1 * | 10/2022 | Cao | G06F 9/5005 |

FOREIGN PATENT DOCUMENTS

WO 2013122815 A1 8/2013

OTHER PUBLICATIONS

Cisco: "Cisco SD-WAN: WAN Edge Onboarding", Prescriptive Deployment Guide, Jan. 2020, pp. 1-100.

* cited by examiner

*Primary Examiner* — Gil H. Lee
(74) *Attorney, Agent, or Firm* — Baker Botts L.L.P.

(57) ABSTRACT

A method for providing a symbiotic network orchestrator utilized to automatically commission edge computing devices on corporate computing networks and edge site computing networks is presented. The method includes receiving an indication of a potential connection of an edge computing device to one or more computing networks associated with the orchestrator. The one or more computing networks includes a corporate computing network and an edge site computing network. The method further includes determining, based on the corporate computing network, the edge site computing network, and a predetermined set of rules, an intent for commissioning the edge computing device, reconfiguring, based on the intent, the corporate computing network and the edge site computing network, and commissioning the edge computing device on one or more of the corporate computing network or the edge site computing network in accordance with the reconfiguring.

20 Claims, 5 Drawing Sheets

SYMBIOTIC NETWORK ORCHESTRATOR FOR COMPUTING NETWORKS

TECHNICAL FIELD

This disclosure relates generally to computing networks, and, more specifically, to a symbiotic network orchestrator for computing networks.

BACKGROUND

Large corporate computing networks with Kubernetes-like deployments may generally be organized into an outer centralized corporate computing network and an inner edge site computing network that connects a remote location of an organization to computing resources. Generally, each of the computing networks may be managed and controlled independently of each by respective network controllers. Because of the siloed configuration of such computing networks, connecting new devices to the edge site computing network, for example, may be complex, time-consuming, and susceptible to immense human error. For example, in many instances, interconnectivity for new devices on the edge site computing network, and, by extension, onto the centralized corporate computing network, may not always be possible due to security and network policies that may be defined by the centralized corporate computing network and/or due to separations of the centralized corporate computing network into subnetworks.

DESCRIPTION OF EXAMPLE EMBODIMENTS

Overview

The present embodiments are directed to techniques for providing a symbiotic network orchestrator utilized to automatically commission edge computing devices on corporate computing networks and edge site computing networks. In particular embodiments, a symbiotic network orchestrator executing on one or more computing devices may receive an indication of a potential connection of an edge computing device to one or more computing networks associated with the symbiotic network orchestrator. For example, in particular embodiments, the one or more computing networks may include a corporate computing network (e.g., software-defined wide area network (SD-WAN)) and an edge site computing network. In particular embodiments, the corporate computing network may be configured to be controlled and managed by a network controller and the edge site computing network may be configured to be controlled and managed by an edge site controller. In particular embodiments, subsequent to receiving the indication of the potential connection of the edge computing device, the symbiotic network orchestrator executing on one or more computing devices may identify the edge computing device.

In particular embodiments, the symbiotic network orchestrator executing on one or more computing devices may then determine, based on the corporate computing network, the edge site computing network, and a predetermined set of rules, an intent for commissioning the edge computing device. For example, in particular embodiments, the symbiotic network orchestrator executing on one or more computing devices may determine the intent for commissioning the edge computing device by receiving runtime event data from the network controller and the edge site controller. In particular embodiments, the runtime event data may include one or more of a configuration of the corporate computing network and the edge site computing network, one or more constraints associated with the corporate computing network and the edge site computing network, or one or more identified scenarios associated with the corporate computing network and the edge site computing network.

In particular embodiments, the symbiotic network orchestrator executing on one or more computing devices may then determine, based on the runtime event data and the predetermined set of rules, the intent for commissioning the edge computing device. In particular embodiments, the predetermined set of rules may include a predetermined set of matching rules for matching the edge computing device to one or more of the corporate computing network or the edge site computing network. For example, in particular embodiments, the predetermined set of matching rules may include one or more of a security rule, a privacy rule, a quality of service (QoS) rule, a policy rule, or a routing rule. In particular embodiments, the symbiotic network orchestrator executing on one or more computing devices may then reconfigure, based on the intent, the corporate computing network and the edge site computing network.

In particular embodiments, the symbiotic network orchestrator executing on one or more computing devices may reconfigure the corporate computing network by providing the intent to the network controller configured to manage and control the corporate computing network, and then reconfiguring, by the network controller, and based on the intent, the corporate computing network by connecting and securing one or more data sources and data sinks associated with the corporate computing network and the edge computing device. In particular embodiments, the symbiotic network orchestrator executing on one or more computing devices may reconfigure the edge site computing network by providing the intent to a network controller configured to manage and control the corporate computing network, and reconfiguring, by the edge site controller, and based on the intent, the edge site computing network by instantiating one or more device drivers and containers associated with the edge site computing network and the edge computing device. In particular embodiments, the symbiotic network orchestrator executing on one or more computing devices may then commission the edge computing device on one or more of the corporate computing network or the edge site computing network in accordance with the reconfiguring.

Technical advantages of particular embodiments of this disclosure may include one or more of the following. Certain systems and methods described herein provide a symbiotic network orchestrator utilized to automatically commission edge computing devices on corporate computing networks and edge site computing networks. For example, the symbiotic network orchestrator manages and records up-to-date event data that is provided by respective network controllers associated with a corporate computing network and edge site computing network to which an edge computing device is to potentially connect. In addition to the event data provided by the respective network controllers, the symbiotic network orchestrator further utilizes a predetermined set of rules (e.g., security rules, privacy rules, QoS rules, policy rules, routing rules, and so forth) to determine and generate an intent for commissioning the edge computing device onto the corporate computing network and the edge site computing network.

In particular examples, the intent determines the manner and process by which the corporate computing network and the edge site computing network are to be reconfigured (e.g., in real-time or near real-time) to properly commission and onboard the edge computing device to the computing networks. In this way, the symbiotic network orchestrator configures and reconfigures the corporate computing network and the edge site computing network concurrently via their respective network controllers, thus allowing the independently controlled and managed corporate computing network and edge site computing network to each have knowledge and insight into the computing resources, data traffic, and requirements of the other of the computing networks. This may lead to an overall improved efficiency, robustness, and reliability of the corporate and edge site computing networks.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

Figure 1A:
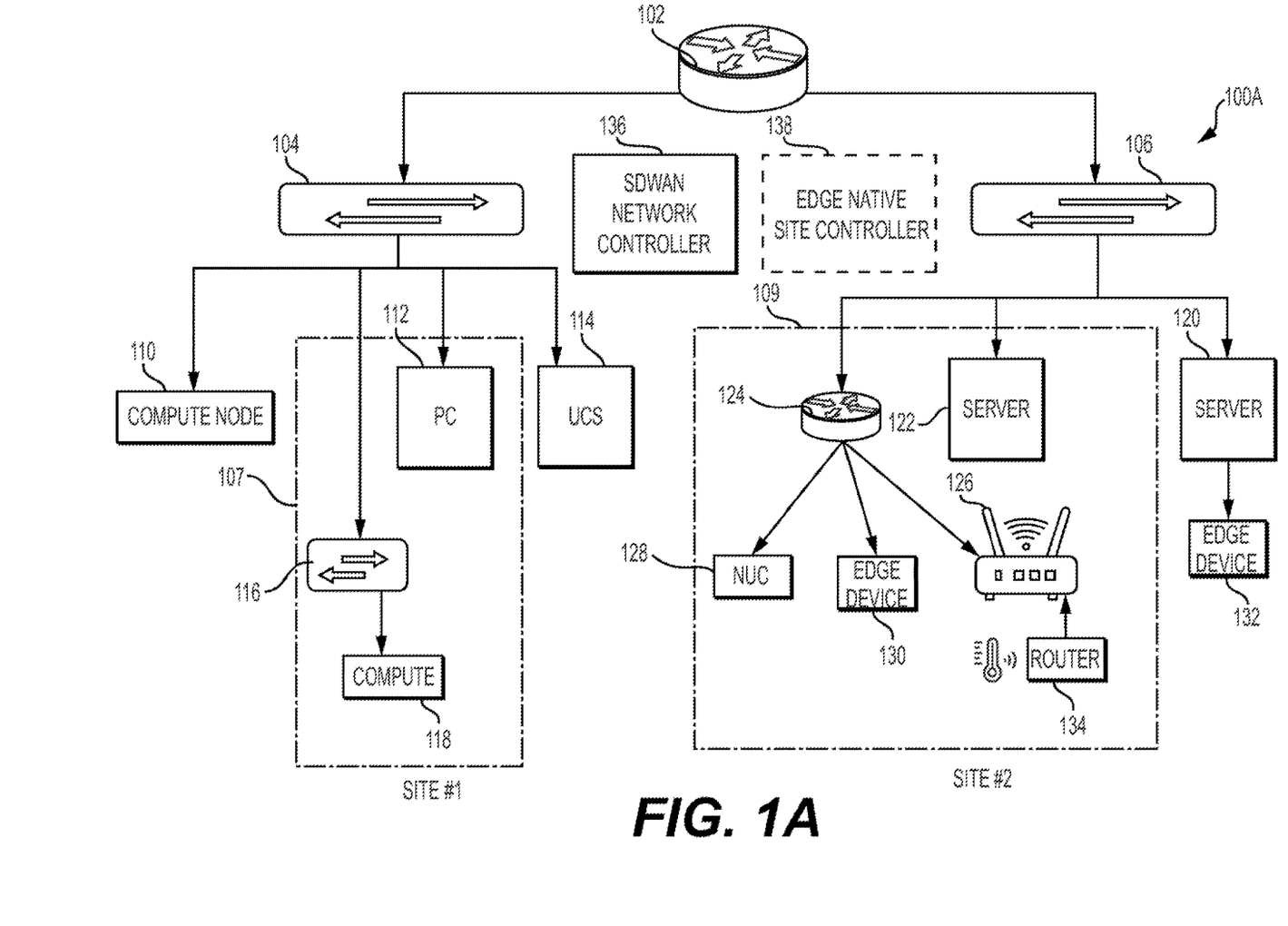
FIG. 1A illustrates an example wireless computing network topology.

FIG. 1A illustrates an example wireless computing network topology 100A, in accordance with the presently disclosed embodiments. In particular embodiments, the wireless computing network topology 100A may include one or more routers 102 that may be connected to one or more transport routers 104 and 106 suitable for transferring data packets between a corporate computing network 107 (e.g., software-defined wide area network (SD-WAN)) and an edge site computing network 109. In particular embodiments, the corporate computing network 107 (e.g., SD-WAN) may include one or more compute nodes 110, one or more personal computers (PCs) 112, a unified computing system (UCS) 114, a transport router 116, and a compute device 118. In particular embodiments, the edge site computing network 109 may include computing network servers 120, 122, a router 124, a wireless access point (WAP) 126, edge compute devices 128, 130, and 132 and a single-board computer 134.

In particular embodiments, the corporate computing network 107 (e.g., SD-WAN) may be controlled and managed by a SD-WAN network controller 136. In particular embodiments, the SD-WAN network controller 136 may include centralized controller suitable for controlling the flow of data traffic throughout the corporate computing network 107. For example, in particular embodiments, the SD-WAN network controller 136 may be utilized to establish and manage a control plane of the corporate computing network 107 (e.g., SD-WAN overlay network) that may include establishing, adjusting, and maintaining the connections that form an SD-WAN fabric.

In particular embodiments, the edge site computing network 109 may be controlled and managed by an edge-native site network controller 138. In particular embodiments, the edge-native site network controller 138 may include, for example, an edge site controller that may be suitable for controlling and managing a number of clusters of devices and systems that may be included as part of the edge site computing network 109. For example, in particular embodiments, the edge-native site network controller 138 may be utilized to establish and manage a control plane at the edge site computing network 109, for example, allowing for the development and deployment of applications at the edge as a service or the deployment and management of applications across many edge locations of the edge site computing network 109.

Figure 1B:
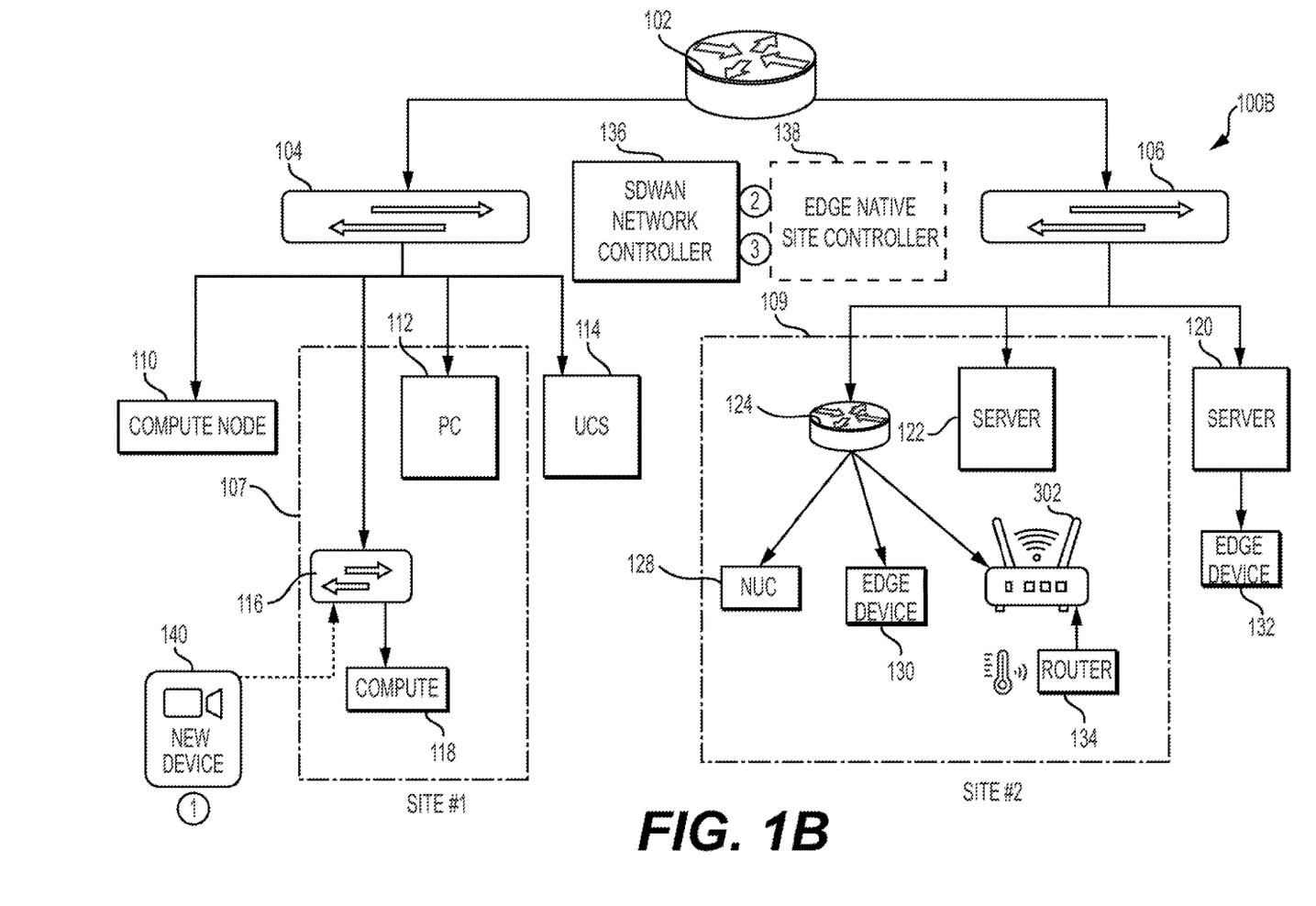
FIG. 1B illustrates an example wireless computing network topology including a newly connected edge computing device.

FIG. 1B illustrates an example wireless computing network topology 100B including a newly connected edge computing device 140, in accordance with the presently disclosed embodiments. In particular embodiments, as generally discussed above with respect to FIG. 1B, the corporate computing network 107 (e.g., SD-WAN) and the edge site computing network 109 may include two different, coexisting computing networks in which the edge site computing network 109 is subsumed by the corporate computing network 107 (e.g., SD-WAN). For example, in one embodiment, the corporate computing network 107 (e.g., SD-WAN)) may include an outer computing network and the edge site computing network 109 may include an inner computing network.

In particular embodiments, each of the corporate computing network 107 (e.g., SD-WAN)) and the edge site computing network 109 may be defined and operate separately and independently of each other, and thus the SD-WAN network controller 136 may have knowledge of the configuration and event data of only the corporate computing network 107 (e.g., SD-WAN) while the edge-native site network controller 138 may have knowledge of the configuration and event data of only the edge site computing network 109. In particular embodiments, when an edge computing device 140 (e.g., one or more cameras, smart mirrors, digital signage, and so forth) is thus connected, for example, to the transport router 116 of the corporate computing network 107 (e.g., SD-WAN), it may be unclear as to the process in which the edge computing device 140 is to be commissioned on the corporate computing network 107 (e.g., SD-WAN) or the edge site computing network 109 and/or which of the corporate computing network 107 (e.g., SD-WAN) and the edge site computing network 109 is to be granted access to the edge computing device 140.

Figure 2:
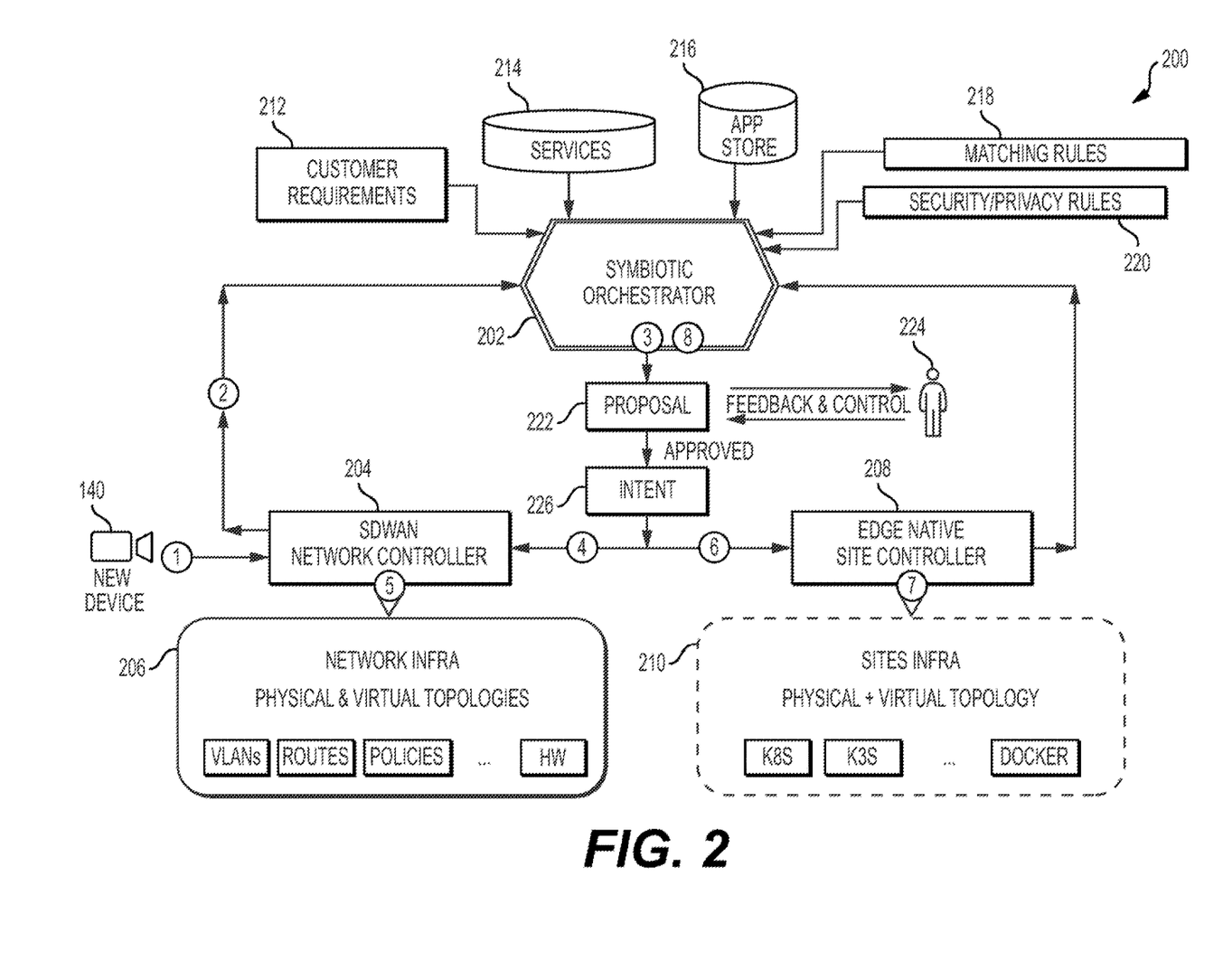
FIG. 2 illustrates a symbiotic network orchestrator computing system utilized to automatically commission edge computing devices on corporate computing networks and edge site computing networks.

FIG. 2 illustrates a symbiotic network orchestration computing system 200 utilized to automatically commission edge computing devices on corporate computing networks and edge site computing networks, in accordance with the presently disclosed embodiments. As depicted by FIG. 2, in particular embodiments, the symbiotic network orchestration computing system 200 may include a symbiotic network orchestrator 202, an SD-WAN network controller 204 that may manage and control a corporate computing network (e.g., SD-WAN) infrastructure 206 (e.g., including various physical and virtual computing resources), and an edge-native site network controller 208 that may manage and control an edge site computing network infrastructure 210 (e.g., including various edge physical and virtual computing resources). In particular embodiments, the corporate computing network infrastructure 206 may correspond to the corporate computing network 107 (e.g., SD-WAN) as discussed above with respect to FIGS. 1A and 1B. Similarly, in particular embodiments, the edge site computing network infrastructure 210 may correspond to the edge site computing network 109 as discussed above with respect to FIGS. 1A and 1B

In particular embodiments, the symbiotic network orchestrator 202 may include any orchestrator that may be suitable for automatically coordinating the SD-WAN network controller 204 and associated corporate computing network infrastructure 206 and the edge-native site network controller 208 and associated edge site computing network infrastructure 210, facilitating connectivity between the SD-WAN network controller 204, the edge-native site network controller 208, and edge routers, and commissioning, authenticating, and validating one or more edge computing devices 140 desiring to join, for example, one or more of the corporate computing network 107 (e.g., SD-WAN) or the edge site computing network 109 in accordance with the presently disclosed embodiments.

For example, in particular embodiments, the symbiotic network orchestrator 202 may receive an indication by way of the SD-WAN network controller 204 or the edge-native site network controller 208 of a connection of one or more edge computing devices 140 to the corporate computing network 107 (e.g., SD-WAN) or the edge site computing network 109. In particular embodiments, subsequent to receiving the indication of the connection of the one or more edge computing devices 140, the symbiotic network orchestrator 202 may receive information identifying the one or more edge computing devices 140. For example, as depicted in FIG. 2, the SD-WAN network controller 204 may provide one or more unique identifiers (e.g., device identification information, device compatibility information, and so forth) associated with the one or more edge computing devices 140 to the symbiotic network orchestrator 202.

In particular embodiments, the symbiotic network orchestrator 202 may also receive real-time or near real-time event data (e.g., at runtime) from the SD-WAN network controller 204 and the edge-native site network controller 208. For example, in particular embodiments, the runtime event data may include one or more of a configuration of the SD-WAN network controller 204 and the edge-native site network controller 208, one or more constraints associated with the SD-WAN network controller 204 and the edge-native site network controller 208, or one or more identified scenarios associated with commissioning edge devices on the SD-WAN network controller 204 and the edge-native site network controller 208. In particular embodiments, the symbiotic network orchestrator 202 may then determine, based on the event data from the SD-WAN network controller 204 and the edge-native site network controller 208 and a predetermined set of rules, an intent for commissioning the one or more edge computing devices 140.

For example, in particular embodiments, the symbiotic network orchestrator 202 may access one or more customer requirements 212, one or more services 214, one or more application stores 216, one or more matching rules (e.g., a security rule, a privacy rule, a quality of service (QoS) rule, a policy rule, a routing rule, and so forth), and/or one or more other rules 218 that may be associated with the one or more edge computing devices 140 and utilized to determine the intent for commissioning the one or more edge computing devices 140. In particular embodiments, the symbiotic network orchestrator 202 may then generate an intent proposal 222, which may be displayed or presented to one or more users or organizations 224 for feedback and/or approval. In particular embodiments, once the intent proposal 222 has been approved by the one or more users or organizations 224, the symbiotic network orchestrator 202 may then push the generated intent 226 to the SD-WAN network controller 204 and the edge-native site network controller 208, respectively.

In particular embodiments, the intent 226 as generated by the symbiotic network orchestrator 202 may include one or more sets of instructions of the manner in which the SD-WAN network controller 204 and the edge-native site network controller 208 are to be reconfigured for commissioning the one or more edge computing devices 140. For example, in particular embodiments, based on the intent 226 as generated and provided by the symbiotic network orchestrator 202, the SD-WAN network controller 204 may then reconfigure the corporate computing network infrastructure 206. In particular embodiments, reconfiguring the corporate computing network infrastructure 206 may include connecting and securing one or more data sources and data sinks associated with the corporate computing network infrastructure 206 with respect to the one or more edge computing devices 140.

In particular embodiments, based on the intent 226 as generated and provided by the symbiotic network orchestrator 202, the edge-native site network controller 208 may then reconfigure the edge site computing network infrastructure 210. In particular embodiments, reconfiguring the edge site computing network infrastructure 210 may include instantiating one or more device drivers and containers associated with the edge site computing network infrastructure 210 with respect to the one or more edge computing devices 140. In particular embodiments, the symbiotic network orchestrator 202 may then commission the one or more edge computing devices 140 on one or more of the corporate computing network infrastructure 206 or the edge site computing network infrastructure 210 in accordance with the respective reconfigurations. In particular embodiments, upon completion of the commissioning of the one or more edge computing devices 140, the symbiotic network orchestrator 202 may also store a record of the reconfigurations of the corporate computing network infrastructure 206 and the edge site computing network infrastructure 210 to, for example, revert back to prior configurations in the case of failed commissioning or other system fault.

Figure 3:
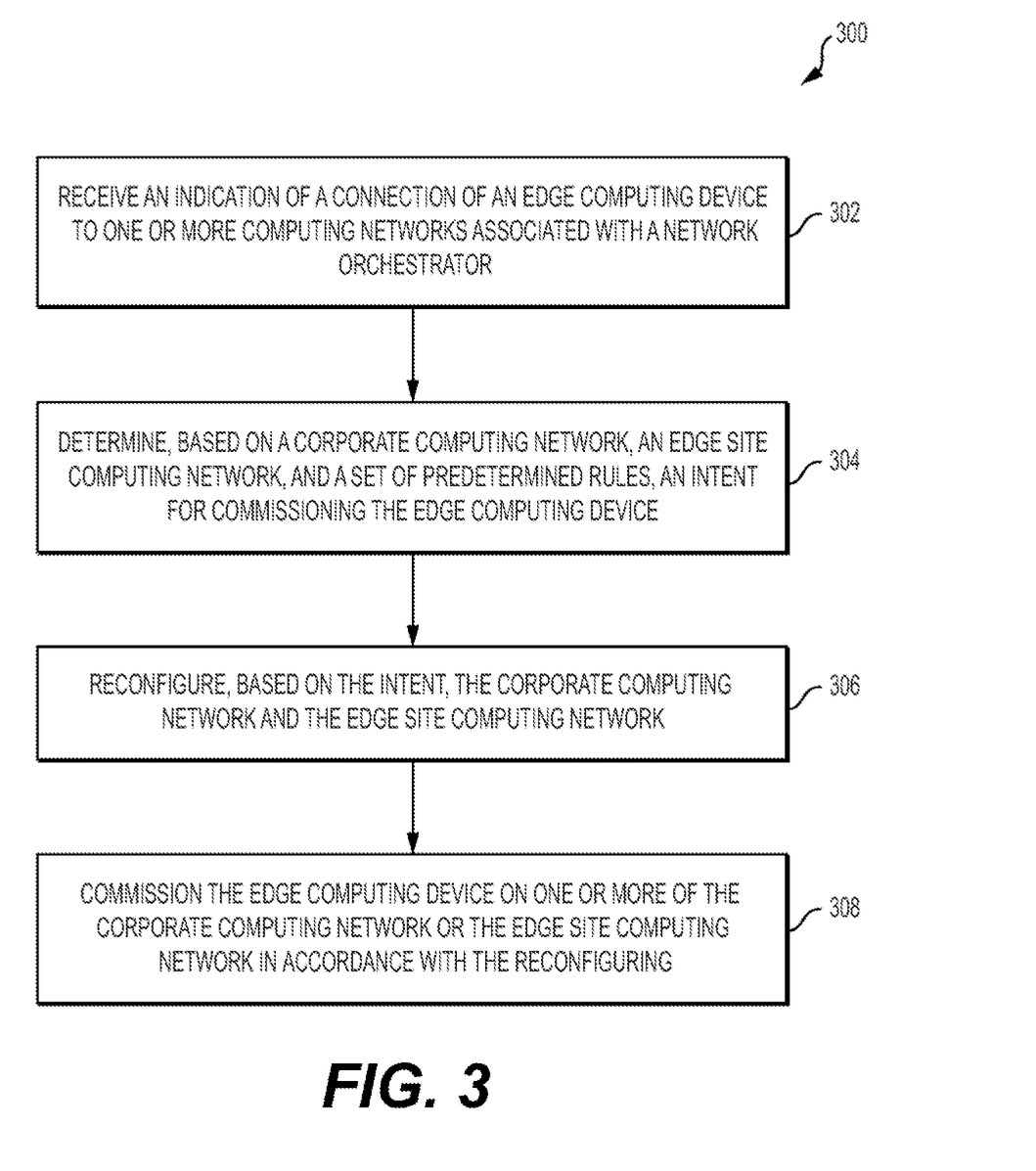
FIG. 3 illustrates a flow diagram of a method for providing a symbiotic network orchestrator utilized to automatically commission edge computing devices on corporate computing networks and edge site computing networks.

FIG. 3 illustrates a flow diagram of a method 300 for providing a symbiotic network orchestrator utilized to automatically commission edge computing devices on corporate computing networks and edge site computing networks, in accordance with the presently disclosed embodiments. The method 300 may be performed utilizing one or more processors that may include hardware (e.g., a general purpose processor, a graphic processing units (GPU), an application-specific integrated circuit (ASIC), a system-on-chip (SoC), a microcontroller, a field-programmable gate array (FPGA), or any other processing device(s) that may be suitable for processing intents and/or desire states), software (e.g., instructions running/executing on one or more processors), firmware (e.g., microcode), or any combination thereof.

The method 300 may begin at block 302 with a network orchestrator executing on one or more computing devices receiving an indication of a potential connection of an edge computing device to one or more computing networks associated with an orchestrator. In particular embodiments, the one or more computing networks may include a corporate computing network and an edge site computing network. The method 300 may continue at block 304 with the network orchestrator executing on one or more computing devices determining, based on the corporate computing network, the edge site computing network, and a predetermined set of rules, an intent for commissioning the edge computing device. For example, in particular embodiments, determining the intent for commissioning the edge computing device further may include receiving runtime event data from the network controller and the edge site controller, in which the runtime event data may include one or more of a configuration of the corporate computing network and the edge site computing network, one or more constraints associated with the corporate computing network and the edge site computing network, or one or more identified scenarios associated with the corporate computing network and the edge site computing network.

In particular embodiments, the network orchestrator executing on one or more computing devices may then determine, based on the runtime event data and the predetermined set of rules, the intent for commissioning the edge computing device. In particular embodiments, the predetermined set of rules may include a predetermined set of matching rules for matching the edge computing device to one or more of the corporate computing network or the edge site computing network. For example, in particular embodiments, the predetermined set of matching rules may include one or more of a security rule, a privacy rule, a quality of service (QoS) rule, a policy rule, or a routing rule. The method 300 may continue at block 306 with the network orchestrator executing on one or more computing devices reconfiguring, based on the intent, the corporate computing network and the edge site computing network.

In particular embodiments, reconfiguring the corporate computing network may include providing the intent to a network controller configured to manage and control the corporate computing network, and reconfiguring, by the network controller, and based on the intent, the corporate computing network by connecting and securing one or more data sources and data sinks associated with the corporate computing network and the edge computing device. In particular embodiments, reconfiguring the edge site computing network may include providing the intent to a network controller configured to manage and control the corporate computing network, and reconfiguring, by the edge site controller, and based on the intent, the edge site computing network by instantiating one or more device drivers and containers associated with the edge site computing network and the edge computing device. The method 300 may conclude at block 308 with the network orchestrator executing on one or more computing devices commissioning the edge computing device on one or more of the corporate computing network or the edge site computing network in accordance with the reconfiguring.

Figure 4:
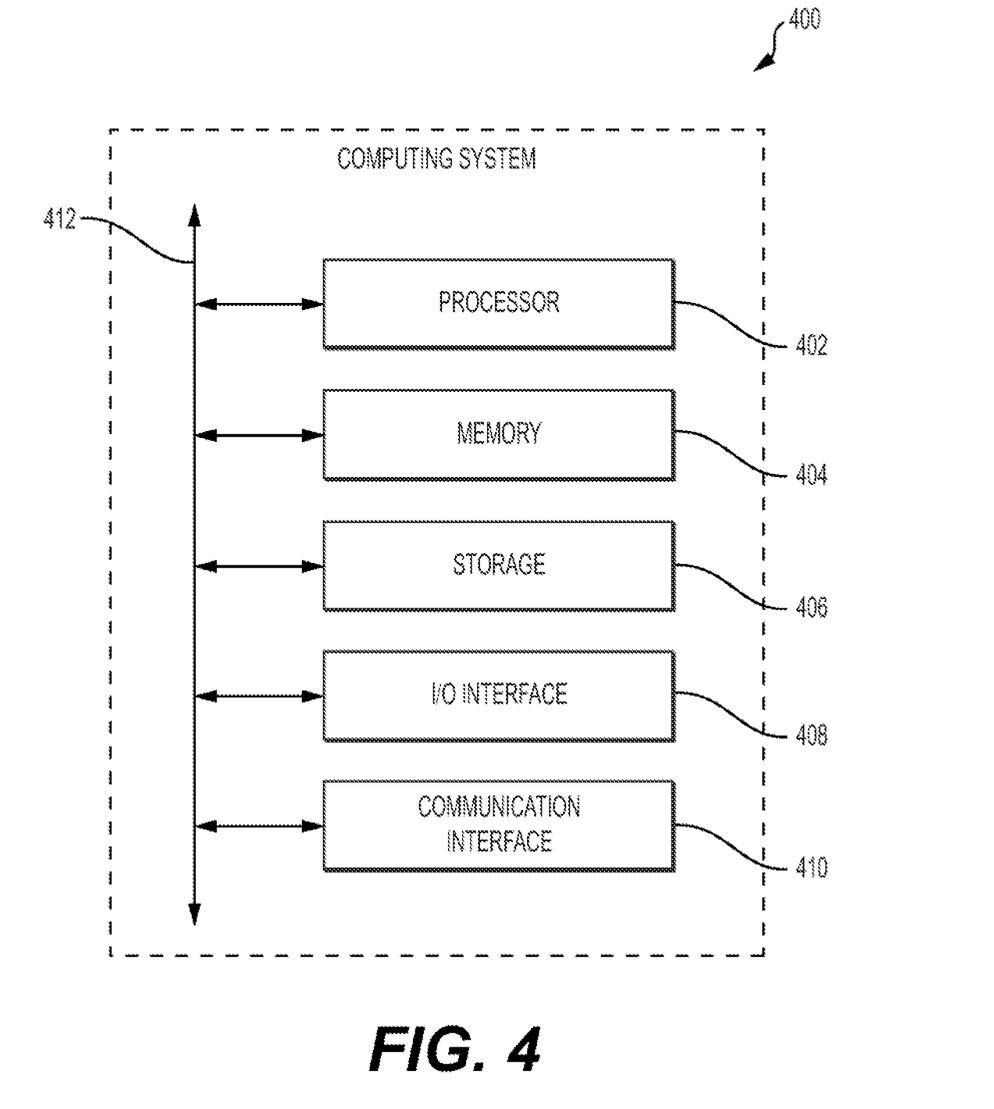
FIG. 4 illustrates an example computer system.

FIG. 4 illustrates an example computer system 400 that may be useful in performing one or more of the foregoing techniques as presently disclosed herein. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein.

As an example, and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate. In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example, and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example, and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402.

Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs);

be a multi-core processor; or include one or more processors 602. Although this disclosure describes and illustrates a particular processor, this disclosure contemplates any suitable processor.

In particular embodiments, memory 404 includes main memory for storing instructions for processor 402 to execute or data for processor 402 to operate on. As an example, and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere).

One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example, and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example, and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it.

As an example, and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, by a network orchestrator executing on one or more computing devices, comprising:
   receiving an indication of a connection of an edge computing device to one or more computing networks associated with the network orchestrator, wherein the one or more computing networks comprises a corporate computing network and an edge site computing network;
   determining, based on the corporate computing network, the edge site computing network, and a predetermined set of rules, an intent for commissioning the edge computing device;
   reconfiguring, based on the intent, the corporate computing network and the edge site computing network; and
   commissioning the edge computing device on one or more of the corporate computing network or the edge site computing network in accordance with the reconfiguring.

2. The method of claim 1, wherein the corporate computing network is configured to be controlled and managed by a network controller and the edge site computing network is configured to be controlled and managed by an edge site controller.

3. The method of claim 2, the method further comprising:
   subsequent to receiving the indication of the connection of the edge computing device, identifying, by the network controller, the edge computing device.

4. The method of claim 2, wherein determining the intent for commissioning the edge computing device further comprises:
   receiving runtime event data from the network controller and the edge site controller, wherein the runtime event data comprises one or more of a configuration of the corporate computing network and the edge site computing network, one or more constraints associated with the corporate computing network and the edge site computing network, or one or more identified scenarios associated with the corporate computing network and the edge site computing network; and
   determining, based on the runtime event data and the predetermined set of rules, the intent for commissioning the edge computing device.

5. The method of claim 1, wherein the predetermined set of rules comprises a predetermined set of matching rules for matching the edge computing device to one or more of the corporate computing network or the edge site computing network.

6. The method of claim 5, wherein the predetermined set of matching rules comprises one or more of a security rule, a privacy rule, a quality of service (QoS) rule, a policy rule, or a routing rule.

7. The method of claim 1, wherein reconfiguring the corporate computing network comprises:
   providing the intent to a network controller configured to manage and control the corporate computing network; and
   reconfiguring, by the network controller, and based on the intent, the corporate computing network by connecting and securing one or more data sources and data sinks associated with the corporate computing network and the edge computing device.

8. The method of claim 1, wherein reconfiguring the edge site computing network comprises:
   providing the intent to a network controller configured to manage and control the corporate computing network; and
   reconfiguring, by an edge site controller, and based on the intent, the edge site computing network by instantiating one or more device drivers and containers associated with the edge site computing network and the edge computing device.

9. A system, comprising:
   one or more non-transitory computer-readable storage media including instructions; and
   one or more processors coupled to the storage media, the one or more processors configured to execute the instructions to:
   receive an indication of a connection of an edge computing device to one or more computing networks associated with a network orchestrator, wherein the one or more computing networks comprises a corporate computing network configured to be managed by a network controller and an edge site computing network configured to be managed by an edge site controller;

determine, based on the corporate computing network, the edge site computing network, and a predetermined set of rules, an intent for commissioning the edge computing device;

reconfigure, based on the intent, the corporate computing network and the edge site computing network; and commission the edge computing device on one or more of the corporate computing network or the edge site computing network in accordance with the reconfiguring.

10. The system of claim 9, wherein the corporate computing network is configured to be controlled and managed by the network controller and the edge site computing network is configured to be controlled and managed by the edge site controller.

11. The system of claim 10, the instructions further comprising instructions to:

subsequent to receiving the indication of the connection of the edge computing device, identify, by the network controller, the edge computing device.

12. The system of claim 10, wherein the instructions to determine the intent for commissioning the edge computing device further comprise instructions to:

receive runtime event data from the network controller and the edge site controller, wherein the runtime event data comprises one or more of a configuration of the corporate computing network and the edge site computing network, one or more constraints associated with the corporate computing network and the edge site computing network, or one or more identified scenarios associated with the corporate computing network and the edge site computing network; and determine, based on the runtime event data and the predetermined set of rules, the intent for commissioning the edge computing device.

13. The system of claim 9, wherein the predetermined set of rules comprises a predetermined set of matching rules for matching the edge computing device to one or more of the corporate computing network or the edge site computing network.

14. The system of claim 13, wherein the predetermined set of matching rules comprises one or more of a security rule, a privacy rule, a quality of service (QoS) rule, a policy rule, or a routing rule.

15. The system of claim 9, wherein the instructions to reconfigure the corporate computing network further comprise instructions to:

provide the intent to the network controller configured to manage and control the corporate computing network; and reconfigure, by the network controller, and based on the intent, the corporate computing network by connecting and securing one or more data sources and data sinks associated with the corporate computing network and the edge computing device.

16. The system of claim 9, wherein the instructions to reconfigure the edge site computing network further comprise instructions to:

provide the intent to the network controller configured to manage and control the corporate computing network; and reconfigure, by the edge site controller, and based on the intent, the edge site computing network by instantiating one or more device drivers and containers associated with the edge site computing network and the edge computing device.

17. A non-transitory computer-readable medium comprising instructions that, when executed by one or more processors of a computing system, cause the one or more processors to:

receive an indication of a connection of an edge computing device to one or more computing networks associated with a network orchestrator, wherein the one or more computing networks comprises a corporate computing network configured to be managed by a network controller and an edge site computing network configured to be managed by an edge site controller;

determine, based on the corporate computing network, the edge site computing network, and a predetermined set of rules, an intent for commissioning the edge computing device;

reconfigure, based on the intent, the corporate computing network and the edge site computing network; and commission the edge computing device on one or more of the corporate computing network or the edge site computing network in accordance with the reconfiguring.

18. The non-transitory computer-readable medium of claim 17, wherein the predetermined set of rules comprises a predetermined set of matching rules for matching the edge computing device to one or more of the corporate computing network or the edge site computing network.

19. The non-transitory computer-readable medium of claim 17, wherein the instructions to reconfigure the corporate computing network further comprise instructions to:

provide the intent to the network controller configured to manage and control the corporate computing network; and reconfigure, by the network controller, and based on the intent, the corporate computing network by connecting and securing one or more data sources and data sinks associated with the corporate computing network and the edge computing device.

20. The non-transitory computer-readable medium of claim 17, wherein the instructions to reconfigure the edge site computing network further comprise instructions to:

provide the intent to the network controller configured to manage and control the corporate computing network; and reconfigure, by the edge site controller, and based on the intent, the edge site computing network by instantiating one or more device drivers and containers associated with the edge site computing network and the edge computing device.

* * * * *